United States Patent
Chen et al.

(10) Patent No.: US 8,281,686 B2
(45) Date of Patent: Oct. 9, 2012

(54) EDDY-CURRENT ACTUATED BALANCER FOR ROTATING MACHINERY

(75) Inventors: Jeng-Shyong Chen, Chiayi County (TW); Po-Ting Li, Taoyuan County (TW); Yong-Chang Zeng, Tainan County (TW)

(73) Assignee: National Chung Cheng University, Chia-Yi (TW)

( * ) Notice: Subject to any disclaimer, the term of this patent is extended or adjusted under 35 U.S.C. 154(b) by 191 days.

(21) Appl. No.: 12/885,691

(22) Filed: Sep. 20, 2010

(65) Prior Publication Data
US 2012/0067121 A1  Mar. 22, 2012

(51) Int. Cl.
- F16F 15/14 (2006.01)
- F16F 15/30 (2006.01)
- F16C 15/00 (2006.01)
- G01M 1/16 (2006.01)

(52) U.S. Cl. ....... 74/574.2; 73/470; 74/574.1; 74/572.2; 74/572.4

(58) Field of Classification Search ............... 74/462, 74/574.2, 574.1, 572.2, 572.4; 73/66, 462, 73/468, 470; 700/279; 301/5.21
See application file for complete search history.

(56) References Cited

U.S. PATENT DOCUMENTS

| | | | |
|---|---|---|---|
| 2,554,523 A * | 5/1951 | Clifford | 74/1.5 |
| 4,300,803 A * | 11/1981 | Chorosevic | 301/5.21 |
| 5,408,875 A * | 4/1995 | Matsushita et al. | 73/462 |
| 5,591,909 A * | 1/1997 | Rothamel et al. | 73/462 |
| 5,757,662 A | 5/1998 | Dyer et al. | |
| 6,189,372 B1 * | 2/2001 | Danz | 73/66 |
| 6,916,997 B2 * | 7/2005 | Thakur et al. | 177/136 |
| 7,155,973 B2 * | 1/2007 | Dyer | 73/462 |
| 7,236,855 B2 * | 6/2007 | Danz et al. | 700/279 |
| 7,717,013 B2 * | 5/2010 | Hildebrand et al. | 74/574.2 |

FOREIGN PATENT DOCUMENTS

JP 2004-101433 * 4/2004

OTHER PUBLICATIONS

English Abstract of JP 2004-101433.*

* cited by examiner

*Primary Examiner* — Vinh T. Luong
(74) *Attorney, Agent, or Firm* — Bacon & Thomas, PLLC

(57) ABSTRACT

An eddy-current actuated balancer includes a barrel having a locating wall at one end thereof; two balancing wheels mounted around the barrel and carrying a respective counterweight at the border, a washer set between the balancing wheels, an elastic ring and a lock ring and a pulsed magnetic field generator mounted on each balancing wheel. The balancing wheels, the washer and the elastic ring are clamped between the locating wall of the barrel and the lock ring. Each pulsed magnetic field generator is controlled to generate a pulsed magnetic field acting upon the associating balancing wheel during its rotation for inducing an eddy current that causes the associating balancing wheel to make an angular displacement relative to the barrel for balance adjustment.

6 Claims, 7 Drawing Sheets

EDDY-CURRENT ACTUATED BALANCER FOR ROTATING MACHINERY

BACKGROUND OF THE INVENTION

1. Field of the Invention

The present invention relates to rotating machinery balancing technology and, more particularly, to an eddy-current actuated balancer for rotating machinery.

2. Description of the Related Art

Under the industry trend of searching for high efficiency, the speed of rotating machinery has been greatly increased. In consequence, the problems of deterioration of processing precision, shortening of component service life and machine safety resulted from mass unbalance of spindle have become important issues to be discussed.

For example, the operating speed of the workpiece rotating shaft and cutting tool rotating spindle of machine tools has been greatly improved and the requirements for processing precision have become more critical. In consequence, spindle balancing techniques have become much more emphasized in the industry. Spindle balancing techniques include two types, i.e., the passive type and the active type. The most commonly seen passive type balancers are ball balancers. Fluidic balancers and electromagnetic-actuated balancers are the most commonly seen active type balancers.

A passive type ball balancer has the advantage of simple structure and does not require any actuator. However, a passive type ball balancer can simply be used in the conditions where the rotating speed is constant and above the resonance frequency of the spindle, for example, for use in CD-ROM dynamic balancing. Active type balancers require an extra actuator to move the counterweight to a predetermined angle so as to achieve balancing. Active type balancers are practical for use in a condition where the rotating speed is to be changed subject to different working conditions, for example, the balancing of the spindle of a machine tool or the transmission shaft of a car. An active type fluid balancer causes flowing of a fluid to a predetermined area subject to heating, thereby adjusting the position of the counterweight. A fluid balancer has the disadvantages of low reaction speed and low precision level. These drawbacks limit the application of a fluid balancer in a high speed spindle for high precision processing. Further, U.S. Pat. No. 5,757,662 discloses an electromagnetically actuate machine balancer, entitled "Electromagnetically actuated rotating machine unbalance compensator". This design pertains to a matured active type dynamic balancing technique. However, because of the use of high precision bearings and permanent magnet arrays, this technique has the drawbacks of expensive cost and large dimension. During installation, the balancer cannot be kept inside the spindle and must be hung on the outside of the spindle.

FIGS. 6 and 7 show an eddy-current actuated balancer according to the prior art. According to this design, a rotary disc (or ring) 93 is mounted on a spindle 91 and partially inserted into an air gap in an electro-magnet 99. The rotary disc 93 is secured to the spindle 91 by means of a friction force. When not actuated by an eddy current, the rotary disc 93 is synchronously rotated with the spindle 91. However, when a magnetic field component is perpendicularly acted upon the surface of the rotary disc 93, the magnetic field will induce an eddy current on the rotary disc 93, and the cross product of the induced eddy current and the magnetic field will cause formation of an actuation force on the rotary disc 93 in a tangent direction reversed to the direction of rotation. When this actuation force overcomes the friction force between the spindle 91 and the rotary disc 93, the rotary disc 93 will be forced to make an angular displacement relative to the spindle 91, i.e. the spindle 91 and the rotary disc 93 will not rotate synchronously. By means of the aforesaid eddy current actuation principle, applying a pulse current to the electro-magnet 99 to generate a pulsed magnetic force on the rotating rotary disc 93 can induce a pulsed eddy-current actuation force on the surface of the rotary disc 93. When this pulsed eddy-current actuation force overcomes the friction force between the spindle 91 and the rotary disc 93, the rotary disc 93 will be forced to make an angular displacement relative to the spindle 91. In FIG. 7, the imaginary circles indicate an eddy current; the arrowhead direction indicates the current flowing direction. This pulsed eddy-current actuated balancing technique has the advantage of capable of driving the rotary disc 93 to make an angular displacement relative to the spindle 91 without touching the rotary disc 93. When compared to U.S. Pat. No. 5,757,662, this pulsed eddy-current actuated balancing technique has simple structure and small size characteristics.

SUMMARY OF THE INVENTION

The present invention has been accomplished under the circumstances in view. It is the main object of the present invention to provide an eddy-current actuated balancer for rotating machinery, which has simple structure and small size characteristics, facilitating installation in the spindle of a rotating machine To achieve these and other objects of the present invention, an eddy-current actuated balancer for rotating machinery comprises a barrel for mounting on a spindle of a rotating machine, the barrel having a locating wall located on its end, at least two balancing wheels sleeved onto the barrel, each balancing wheel carrying a counterweight at a border area thereof, a washer sleeved onto the barrel and set between the balancing wheels, an elastic ring sleeved onto the barrel, a lock ring fastened to the other end of the barrel. Further, each balancing wheel carries at least one pulsed magnetic field generator for generating a pulsed magnetic field to act upon the associating balancing wheel. The generated pulsed magnetic field from each pulsed magnetic field generator comprises at least one vertical component that acts upon the wheel surface of the associating balancing wheel. Further, the at least two balancing wheels, the washer and the elastic ring are clamped between the locating wall of the barrel and the lock ring. The pulsed magnetic field generators are controlled to generate a pulsed magnetic field acting upon the balancing wheels respectively during rotation of the balancing wheels for inducing an eddy current so that the cross product of the respective eddy current and the respective pulsed magnetic field causes formation of a thrust force in a tangent direction reversed to the direction of rotation of the spindle that causes the associating balancing wheel to make an angular displacement and to move the respective counterweight to expected position.

DETAILED DESCRIPTION OF THE INVENTION

Figure 1:
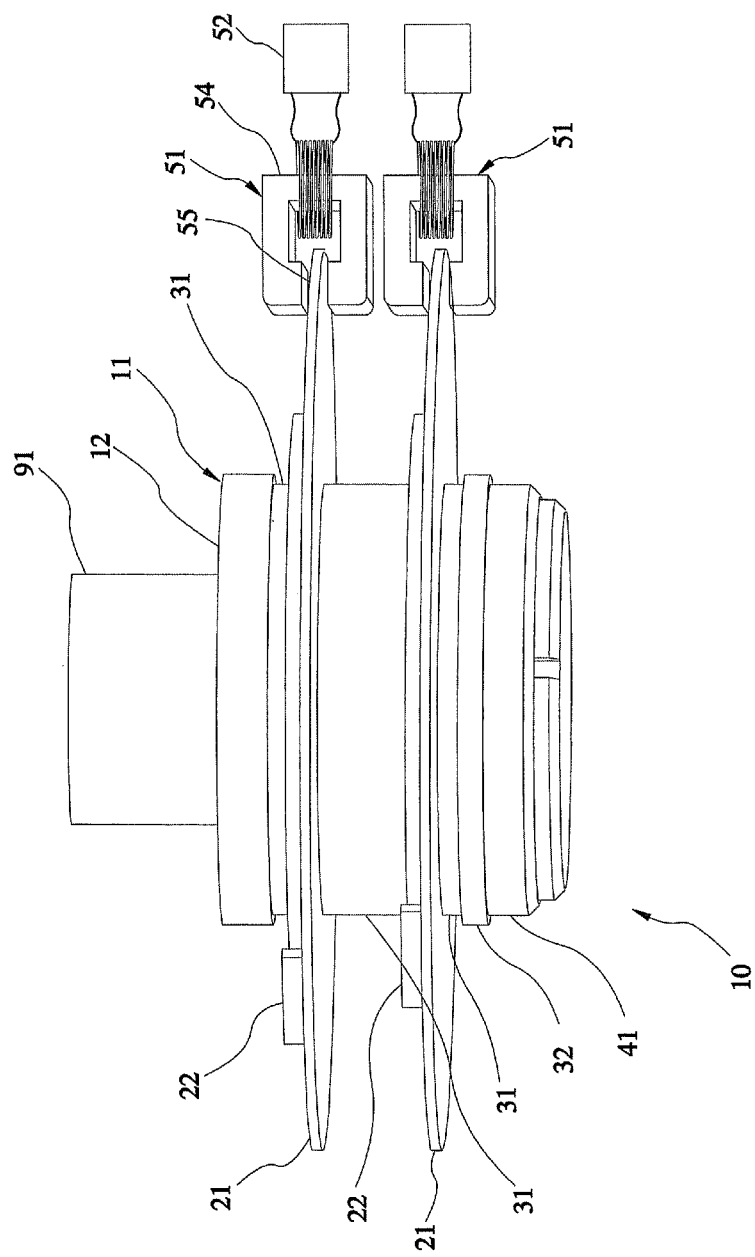
FIG. 1 is an elevational assembly view of an eddy-current actuated balancer for rotating machinery in accordance with the present invention.
Figure 2:
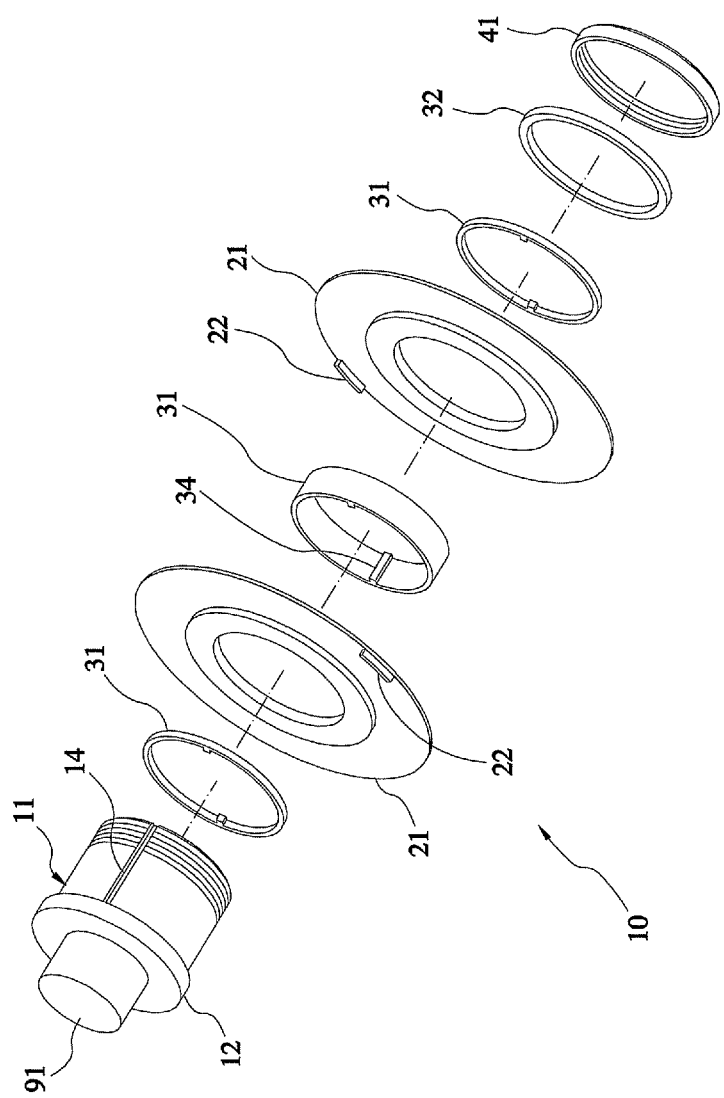
FIG. 2 is an exploded view of the eddy-current actuated balancer for rotating machinery in accordance with the present invention after removal of the pulsed magnetic field generators.

Referring to FIGS. 1 and 2, an eddy-current actuated balancer 10 in accordance with the present invention is shown comprising a barrel 11, two balancing wheels 21, three washers 31, an elastic ring 32, a lock ring 41 and two pulsed magnetic field generators 61.

The barrel 11 is connected to a spindle 91 of a machine. The barrel 11 has a locating wall 12 located on its one end for positioning, and at least one locating groove 14 located on the periphery and extending along its longitudinal axis.

The balancing wheels 21 are metal wheels sleeved onto the barrel 11, each carrying a counterweight 22 at a border area thereof.

The washers 31 are sleeved onto the barrel 11. One of the washers 31 is set between the locating wall 12 of the barrel 11 and one balancing wheel 21. Another one of the washers 31 is set between the two balancing rings 21. The other washer 31 is set between the other balancing wheel 21 and the elastic ring 32. Further, each washer 31 has a locating rib 34 protruded from the inside wall thereof for engaging one locating groove 14 of the barrel 1. The washers 31 are made from a soft metal material, for example, bronze to reduce wear of the balancing wheels 21 upon an angular displacement. Further, the washer 31 that is set between the two balancing wheels 21 works as a spacer to keep the two balancing wheels 21 apart so that the two balancing wheels 21 can be rotated relative to each other without causing interference.

The elastic ring 32 can be a rubber cushion, wave spring or disc spring. According to this embodiment, the elastic ring 32 is a rubber cushion sleeved onto the barrel 11.

The lock ring 41 is fastened to the other end of the barrel 11 remote from the locating wall 12. According to this embodiment, the lock ring 41 is threaded onto the other end of the barrel 11 remote from the locating wall 12.

Further, the balancing wheels 21, the washers 31 and the elastic ring 32 are secured to the barrel 11 between the locating wall 12 and the lock ring 41.

Further, the two pulsed magnetic field generators 51 are respectively mounted on the balancing wheels 21 for generating a pulsed magnetic field to act upon the associating balancing wheels 21. The generated pulsed magnetic field includes at least one vertical component that acts upon the wheel surface of the associating balancing wheel 21. Each pulsed magnetic field generator 51 comprises a pulsed current generator 52 and a C-shaped electro-magnet 54. The C-shaped electro-magnet 54 defines an air gap 55 for the insertion of one balancing wheel 21. The pulsed current generator 52 provides a pulsed current to the C-shaped electro-magnet 54, causing the C-shaped electro-magnet 54 to produce a pulsed magnetic field in the air gap 55.

When one balancing wheel 21 is partially inserted into the air gap 55 and rotated, the pulsed magnetic field has at least one vertical component act upon the wheel surface of the balancing wheel 21, thereby inducing an eddy current (according to this embodiment, the pulsed magnetic field extends perpendicular to the associating balancing wheel 21). The cross product of the induced eddy current and the pulsed magnetic field causes formation of a thrust in a tangent direction reversed to the direction of rotation of the spindle 91. This thrust causes the associating balancing wheel 21 to make a small angular displacement during its rotary motion. By means of controlling the amount of pulses of the pulsed magnetic field, the rotation angle of the respective balancing wheel 21 is controlled.

According to this embodiment, the elastic ring 32 is set between the lock ring 41 and one washer 31 and abutted against the lock ring 41. The elastic ring 32 provides a pre-pressure subject to its return elastic energy, enabling the lock ring 41 to force the component parts toward the locating wall 12 of the barrel 11 so that the balancing wheels 21 are secured to the spindle 91 subject to the friction force produced between the balancing wheels 21 and the washers 31. When no any eddy current is induced, this friction force enables the balancing wheels 21 and the barrel 11 to be rotated with the spindle 91.

Figure 3:
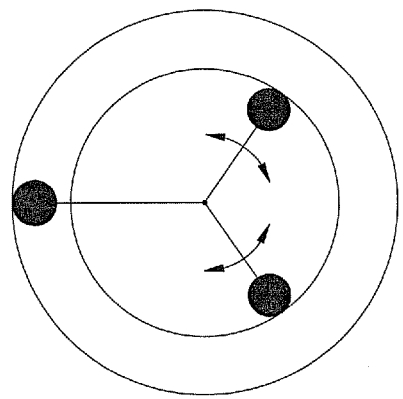
FIG. 3A is a schematic drawing of the present invention showing the status of the eddy-current actuated balancer before balance adjustment.
FIG. 3B is a schematic drawing of the present invention showing the status of the eddy-current actuated balancer after balance adjustment.
Figure 3:
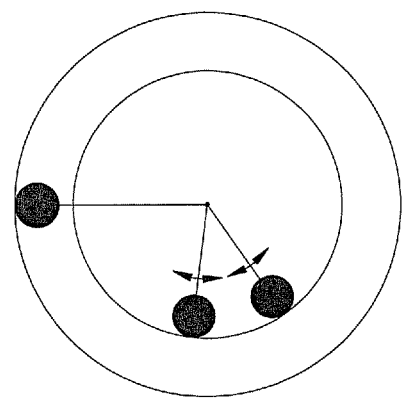

In actual use, as shown in FIG. 2, the balancer 10 is connected to a rotating machine's spindle 91 by means of the barrel 11, and the balancing wheels 21 are secured to the barrel 11 and the spindle 91 subject to the clamping force between the locating wall 12 and the lock ring 51. During rotation of the spindle 91, the counterweights 22 at the balancing wheels 21 produce a balancing effect. When any unbalancing condition occurs during rotation of the spindle 91, the pulsed magnetic field generator 51 at each balancing wheel 21 can be used to control the associating balancing wheel 21 in making an angular displacement relative to the spindle 91 to change the angular position of the associating counterweight 22 relative to the spindle 91, thereby achieving balance correction. The pulsed magnetic field generators 51 can be mounted inside the rotating machine (not shown). Alternatively, external pulse magnetic field generators may be used to make balancing adjustment. FIGS. 3A and FIG. 3B illustrate the status of the eddy-current actuated balancer before and after balance adjustment. In FIGS. 3A and 3B, the outer black dot in the outer race indicates the amount of unbalance of the spindle 91, and the two black dots in the inner race represent the gravity center of each of the two counterweights 22 respectively. Before balance adjustment, as shown in FIG. 3A, the point of combined force of the center of gravity of the two counterweight 22 is not in balance with the unbalance of the spindle 91. After adjustment of the angular positions of the counterweights 22 by means of pulsed eddy current, the balanced status shown in FIG. 3B is obtained.

Figure 4:
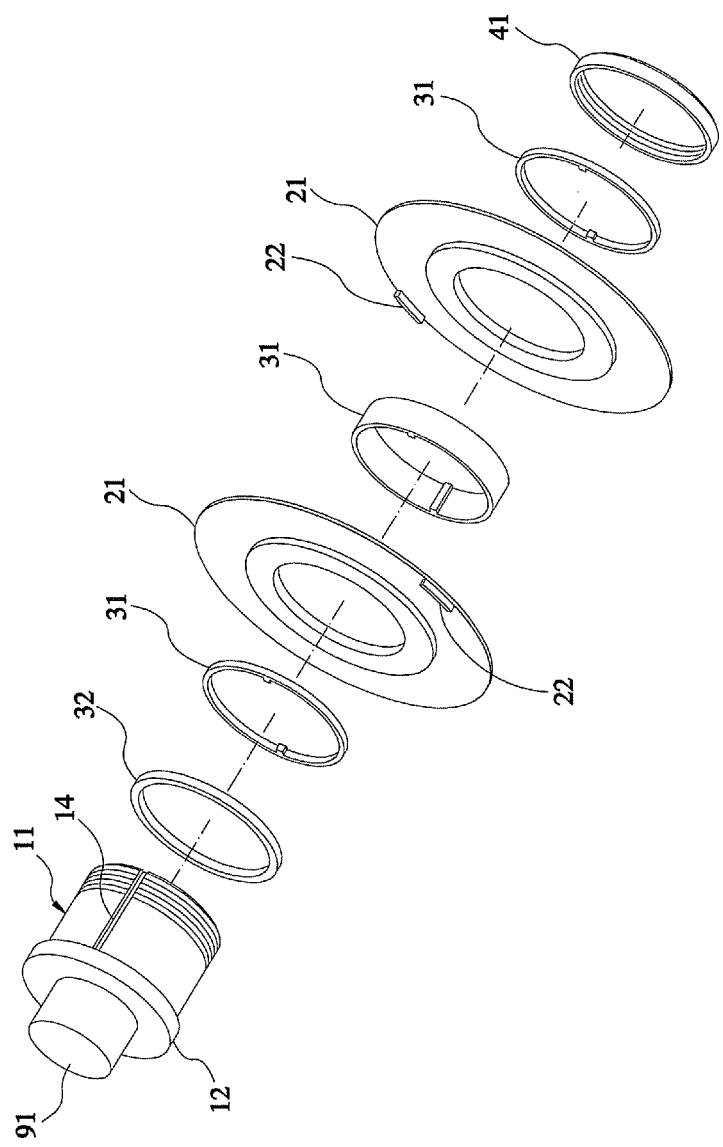
FIG. 4 is an exploded view of an alternate form of the eddy-current actuated balancer for rotating machinery in accordance with the present invention, showing the elastic ring set between the locating wall of the barrel and one balancing wheel.

FIG. 4 shows an alternate form of the eddy-current actuated balancer for rotating machinery in accordance with the present invention. As illustrated in FIG. 4, the elastic ring 32 can be set between the locating wall 12 of the barrel 11 and one balancing wheel 21 and abutted against the locating wall 12. The elastic ring 32 provides the same elastic buffer effect as the aforesaid first embodiment shown in FIGS. 1 and 2. The positioning of the elastic ring 32 is not limited to the arrangement between the lock ring 41 and one balancing wheel 21.

Figure 5:
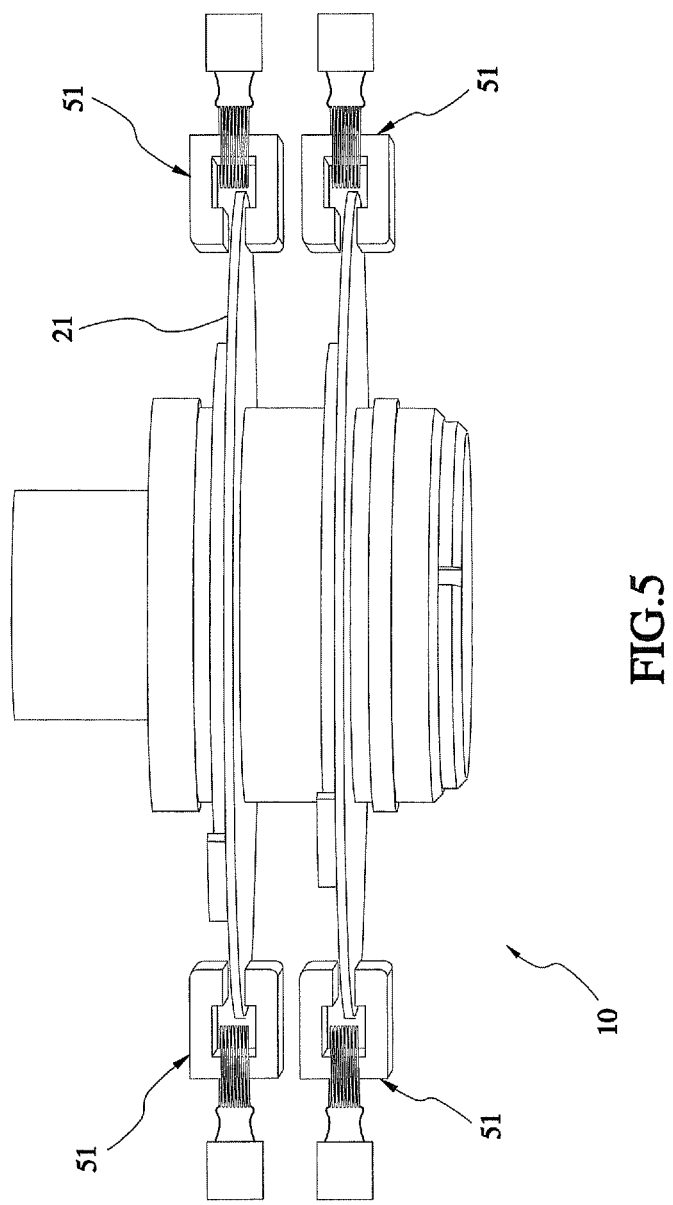
FIG. 5 is an elevational assembly view of another alternate form of the eddy-current actuated balancer for rotating machinery in accordance with the present invention, showing the elastic ring set between the locating wall of the barrel and one balancing wheel, showing two pulsed magnetic field generators arranged on each balancing wheel.
Figure 6:
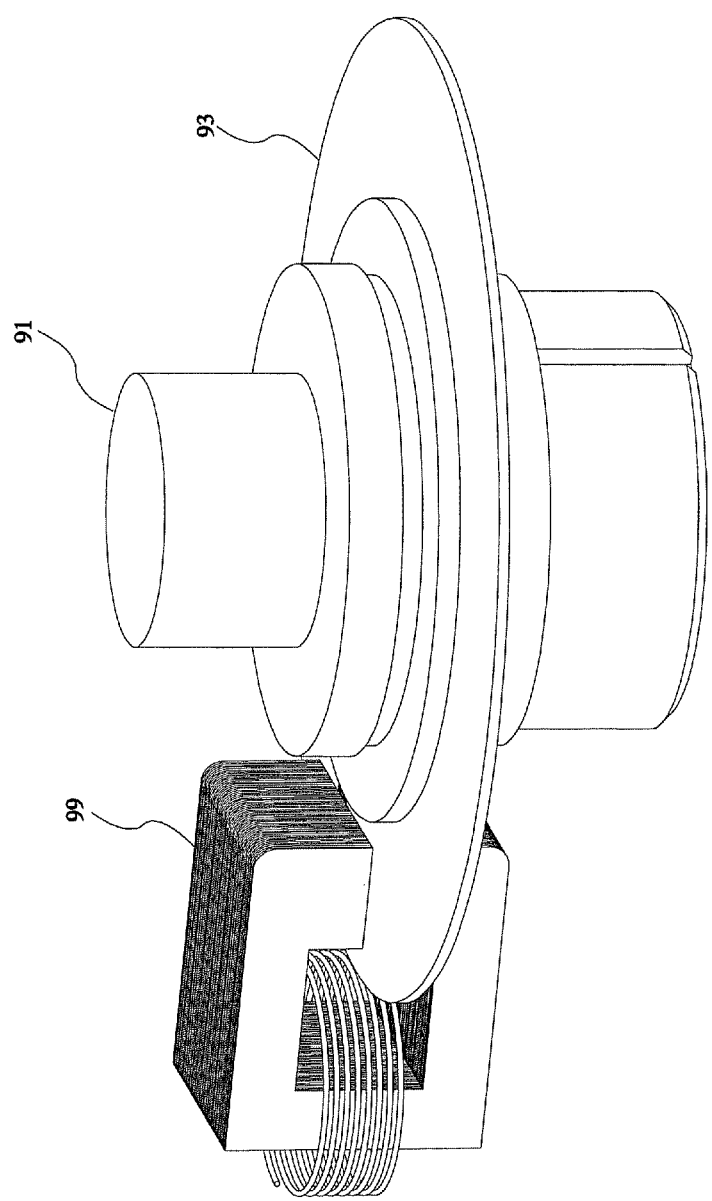
FIG. 6 is schematic drawing of an eddy-current actuated balancer according to the prior art, showing a rotary disc set in an air gap in an electro-magnet and kept spaced from the electro-magnet.
Figure 7:
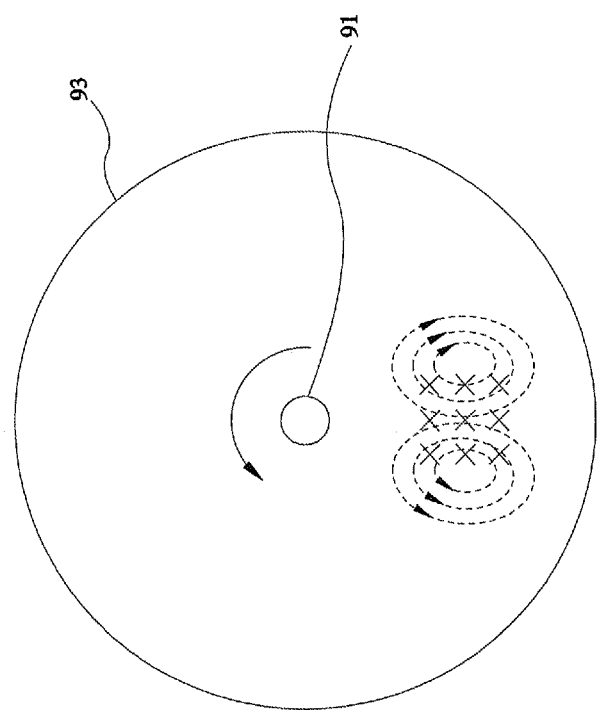
FIG. 7 is a schematic drawing showing an eddy current acted upon the rotary disc according to the prior art design.

FIG. 5 illustrates another alternate form of the eddy-current actuated balancer for rotating machinery in accordance with the present invention. According to this alternate form, two pulsed magnetic field generators 51 are arranged on each balancing wheel 21 to produce an enhanced effect, facilitating quick adjustment of the angular position of each balancing wheel 21.

In conclusion, the eddy-current actuated balancer of the present invention allows balance adjustment during rotation, i.e., the invention pertains to an active balancing technique. Further, the invention directly mount the balancing wheels 21 on the rotating machine's spindle 91 by means of the barrel 11, having small size and simple structure characteristics.

What is claimed is:

1. An eddy-current actuated balancer, comprising:
    a barrel for mounting on a spindle of a rotating machine, said barrel comprising a first end, a second end opposite to said first end and a locating wall located on said first end;
    at least two balancing wheels sleeved onto said barrel, each said balancing wheel carrying a counterweight at a border area thereof;
    a washer sleeved onto said barrel and set between said balancing wheels;
    an elastic ring sleeved onto said barrel;
    a lock ring fastened to the second end of said barrel; and
    each said balancing wheel carries at least one pulsed magnetic field generator for generating a pulsed magnetic field to act upon the associating balancing wheel, the generated pulsed magnetic field from each said pulsed magnetic field generator comprising at least one vertical component that acts upon the wheel surface of the associating balancing wheel;
    said at least two balancing wheels, said washer and said elastic ring are clamped between said locating wall of said barrel and said lock ring;
    said pulsed magnetic field generators are controlled to generate a pulsed magnetic field acting upon said balancing wheels respectively during rotation of said balancing wheels for inducing an eddy current so that the cross product of the respective eddy current and the respective pulsed magnetic field causes formation of a thrust force in a tangent direction reversed to the direction of rotation of said spindle that causes the associating balancing wheel to make an angular displacement.

2. The eddy-current actuated balancer as claimed in claim 1, wherein said barrel comprises at least one locating groove extending along the longitudinal axis thereof; a washer is mounted around said barrel and set between said locating wall of said barrel and one said balancing wheel; each said washer comprises at least one locating rib protruded from an inside wall thereof and engaged into said at least one locating groove of said barrel.

3. The eddy-current actuated balancer as claimed in claim 1, wherein said elastic ring is abutted against said locating wall of said barrel for producing a pre-pressure.

4. The eddy-current actuated balancer as claimed in claim 1, wherein said elastic ring is abutted against said lock ring.

5. The eddy-current actuated balancer as claimed in claim 1, wherein said balancing wheels are made from a metal material for inducing an eddy current respectively upon the action of the pulsed magnetic field generated by the respective pulsed magnetic field generator.

6. The eddy-current actuated balancer as claimed in claim 1, wherein each said pulsed magnetic field generator comprises a pulsed current generator and a C-shaped electro-magnet, said C-shaped electro-magnet defining an air gap for the insertion of the associating balancing wheel partially.

* * * * *